(12) United States Patent
Katzri (10) Patent No.: US 12,363,037 B2
(45) Date of Patent: Jul. 15, 2025

(54) ADAPTING FORWARDING DATABASE LEARNING RATE BASED ON FILL LEVEL OF FORWARDING TABLE

(71) Applicant: Marvell Israel (M.I.S.L) Ltd., Yokneam (IL)

(72) Inventor: Yaron Katzri, Ness-Ziona (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 530 days.

(21) Appl. No.: 17/883,310

(22) Filed: Aug. 8, 2022

(65) Prior Publication Data

US 2023/0037476 A1   Feb. 9, 2023

Related U.S. Application Data (60) Provisional application No. 63/230,588, filed on Aug. 6, 2021.

(51) Int. Cl.
*H04L 45/745* (2022.01)
*H04L 43/16* (2022.01)
*H04L 47/25* (2022.01)

(52) U.S. Cl.
CPC ............ *H04L 45/745* (2013.01); *H04L 43/16* (2013.01); *H04L 47/25* (2013.01)

(58) Field of Classification Search
CPC ....... H04L 45/745; H04L 43/16; H04L 47/25; H04L 45/023; H04L 45/742; H04L 45/74591; H04L 45/021; H04L 45/54; H04L 45/74; H04L 49/50
See application file for complete search history.

(56) References Cited

U.S. PATENT DOCUMENTS

| | | | |
|---|---|---|---|
| 6,876,654 B1 * | 4/2005 | Hegde | H04L 12/4625 370/466 |
| 7,420,919 B1 * | 9/2008 | Toudeh-Fallah | H04L 47/30 370/235 |
| 7,796,590 B1 * | 9/2010 | Melman | H04L 49/3009 370/428 |
| 7,826,452 B1 | 11/2010 | Bishara et al. | |
| 9,203,735 B2 | 12/2015 | Melman et al. | |

(Continued)

OTHER PUBLICATIONS

International Search Report and Written Opinion for PCT Patent Application No. PCT/IB2022/057390, mailed Nov. 22, 2022. (12 pages).

*Primary Examiner* — Habte Mered (57) ABSTRACT

A packet processor of a network device repeatedly determines a fill level of a forwarding table that is populated with associations between network addresses and network interfaces of, or coupled to, the network device. The packet processor adjusts, based on the fill level of the forwarding table, a maximum rate according to which the packet processor is permitted to send messages to a central processing unit (CPU) coupled to the packet processor, the messages indicating network addresses that are to be stored in the forwarding table by the CPU. The packet processor of the network device receives packets via network links coupled to the network device; identifies new network addresses of the packets that are not in the forwarding table; and sends messages to the CPU at a rate that does not exceed the maximum rate, the messages indicating the new network addresses are to be added to the forwarding table.

20 Claims, 7 Drawing Sheets

(56) References Cited

U.S. PATENT DOCUMENTS

| | | | |
|---|---|---|---|
| 9,306,851 | B1 | 4/2016 | Gazit et al. |
| 9,537,771 | B2 | 1/2017 | Arad et al. |
| 10,700,974 | B2 | 6/2020 | Shmilovici |
| 2003/0231587 | A1* | 12/2003 | Sankaran ............... H04L 45/02 370/230 |
| 2005/0094634 | A1 | 5/2005 | Santhanakrishnan et al. |
| 2014/0289193 | A1 | 9/2014 | Zhou et al. |
| 2022/0103481 | A1* | 3/2022 | Kamat ................. H04L 49/109 |
| 2023/0021517 | A1* | 1/2023 | Jiang ..................... H04L 45/54 |

* cited by examiner

ADAPTING FORWARDING DATABASE LEARNING RATE BASED ON FILL LEVEL OF FORWARDING TABLE

CROSS REFERENCES TO RELATED APPLICATIONS

This application claims the benefit of U.S. Provisional Patent Application No. 63/230,588, entitled "Adaptive Learning Rate for MAC Addresses," filed on Aug. 6, 2021, the disclosure of which is hereby expressly incorporated herein by reference in its entirety.

FIELD OF TECHNOLOGY

The present disclosure relates generally to communication networks, and more particularly to populating a forwarding table in a network device.

BACKGROUND

Network devices such as network switches, routers, edge devices and the like typically use forwarding tables to determine one or more network interfaces (e.g., ports, link aggregate groups (LAGs), tunnels, etc.) to which a received packet should be forwarded. The forwarding table includes network address-network interface associations that indicate, for each network address, a set of one or more network interfaces to which a packet having the network address should be forwarded.

Network devices often utilize address learning techniques to populate a forwarding table. For example, when a packet is received by the network device, the network device determines whether a source network address (e.g., a source media access control (MAC) address) is included in the forwarding table. If the source network address is already in the forwarding table, no "learning" of the source network address is performed. On the other hand, if the source network address is not already in the forwarding table, the source network address is considered a "new network address" and the network device stores in the forwarding table a new entry that indicates an association between the new network address and a particular network interface via which the packet was received. The storing of information indicating the association between the new network address and the particular network interface in the forwarding table is sometimes referred to as "learning" the new network address. The information indicating the association between the new network address and the particular network interface typically comprises i) the new network address (or information generated using the new network address, such as a hash of the new network address), and ii) an identifier of the particular network interface. If a subsequent packet that includes the new network address as a destination network address is received by the network address, the new entry in the forwarding table indicates that the subsequent packet should be forwarded to the particular network interface.

One type of address learning is sometimes referred to as "automatic learning." With automatic learning, hardware circuitry of the network device performs inspection of incoming packets, e.g., for source network addresses not already in the forwarding table, and population of the forwarding table with new entries without any intervention by software. With automatic learning, software sometimes modifies the forwarding table by analyzing entries to rearrange entries in the table and/or remove entries (e.g., old entries that have not been used for a particular period of time) to free up space in the forwarding table, for example.

Another type of address learning is sometimes referred to as "controlled learning." With controlled learning, hardware circuitry of the network device performs inspection of incoming packets, e.g., for source network addresses not already in the forwarding table. However, instead of the hardware circuitry populating the forwarding table itself, the hardware circuitry merely reserves space in the forwarding table for potential new entries that correspond to new source network addresses identified by the hardware circuitry, and then informs software about any new source network address-network interface association(s) that are identified. The software then decides whether to create a new entry in the forwarding table for a new source network address or to ignore the new source address. In some implementations of controlled learning, if the hardware circuitry is unable to reserve space in the forwarding table for an entry corresponding to a new source network address (e.g., because the forwarding table is full), the hardware circuitry informs the software that a new source network address was identified but that the hardware circuitry was unable reserve space in the forwarding table for the new source network address.

One benefit of using controlled learning rather than automatic learning is the ability to use more complex techniques that would be impractical and/or cost prohibitive to implement in hardware circuitry, such as techniques for determining whether to add a new entry based on security concerns or based on virtual fill limits, and techniques that utilize sophisticated rehashing procedures to locate free space in the forwarding table.

SUMMARY

In an embodiment, a network device comprises: a memory configured to store a forwarding table that includes associations between network addresses and network interfaces of, or coupled to, the network device; and a packet processor configured to process packets received via the network interfaces. The packet processor is further configured to determine, using the forwarding database, network interfaces to which the packets are to be forwarded for transmission. The packet processor includes: a fill level monitor configured to determine a fill level of the forwarding table; and a forwarding table updating engine. The forwarding table updating engine is configured to: adjust, based on the fill level of the forwarding table, a maximum rate according to which the packet processor is permitted to send messages to a central processing unit (CPU) coupled to the packet processor, the messages indicating network addresses that are to be stored in the forwarding table by the CPU; identify new network addresses of packets received via the network interfaces that are not in the forwarding table; and send to the CPU, at a rate that does not exceed the maximum rate, messages that indicate the new network addresses are to be added to the forwarding table, the CPU being configured to selectively add the new network addresses to the forwarding table.

In another embodiment, a method for populating a forwarding table of a network device includes: repeatedly determining, at a packet processor, a fill level of a forwarding table that is populated with associations between network addresses and network interfaces of, or coupled to, the network device; adjusting, by the packet processor and based on the fill level of the forwarding table, a maximum rate according to which the packet processor is permitted to send messages to a central processing unit (CPU) coupled to the packet processor, the messages indicating network addresses that are to be stored in the forwarding table by the CPU; receiving, at the packet processor of the network device, packets via network links coupled to the network device; identifying, at the packet processor, new network addresses of the packets that are not in the forwarding table; and sending, by the packet processor, messages to the CPU at a rate that does not exceed the maximum rate, the messages indicating the new network addresses are to be added to the forwarding table, the CPU being configured to selectively add the new network addresses to the forwarding table.

DETAILED DESCRIPTION

In embodiments described below, a packet processor of a network device includes a forwarding table, and the packet processor is configured to, as part of a controlled learning technique, determine when network addresses are not stored in the forwarding table. When a network address is identified as an address that is not stored in the forwarding table, the packet processor sends a message to a central processing unit (CPU) to indicate that the network address is not stored in the forwarding table. In response to the messages, the CPU selectively stores the network addresses (or information generated using the new network addresses, such as a hashes of the new network addresses) in the forwarding table along information regarding network interfaces of the network device that are associated with the new network addresses. When a fill level of the forwarding table is relatively high, the CPU may need to expend significant computational resources in order to create space in the forwarding table to store new network addresses (and associated network interface information). Therefore, in order to avoid overloading the CPU when the CPU is already expending significant computational resources, the packet processor is configured to adjust, based on a fill level of the forwarding table, a maximum rate at which the packet processor is permitted to send messages to the CPU.

Figure 1:
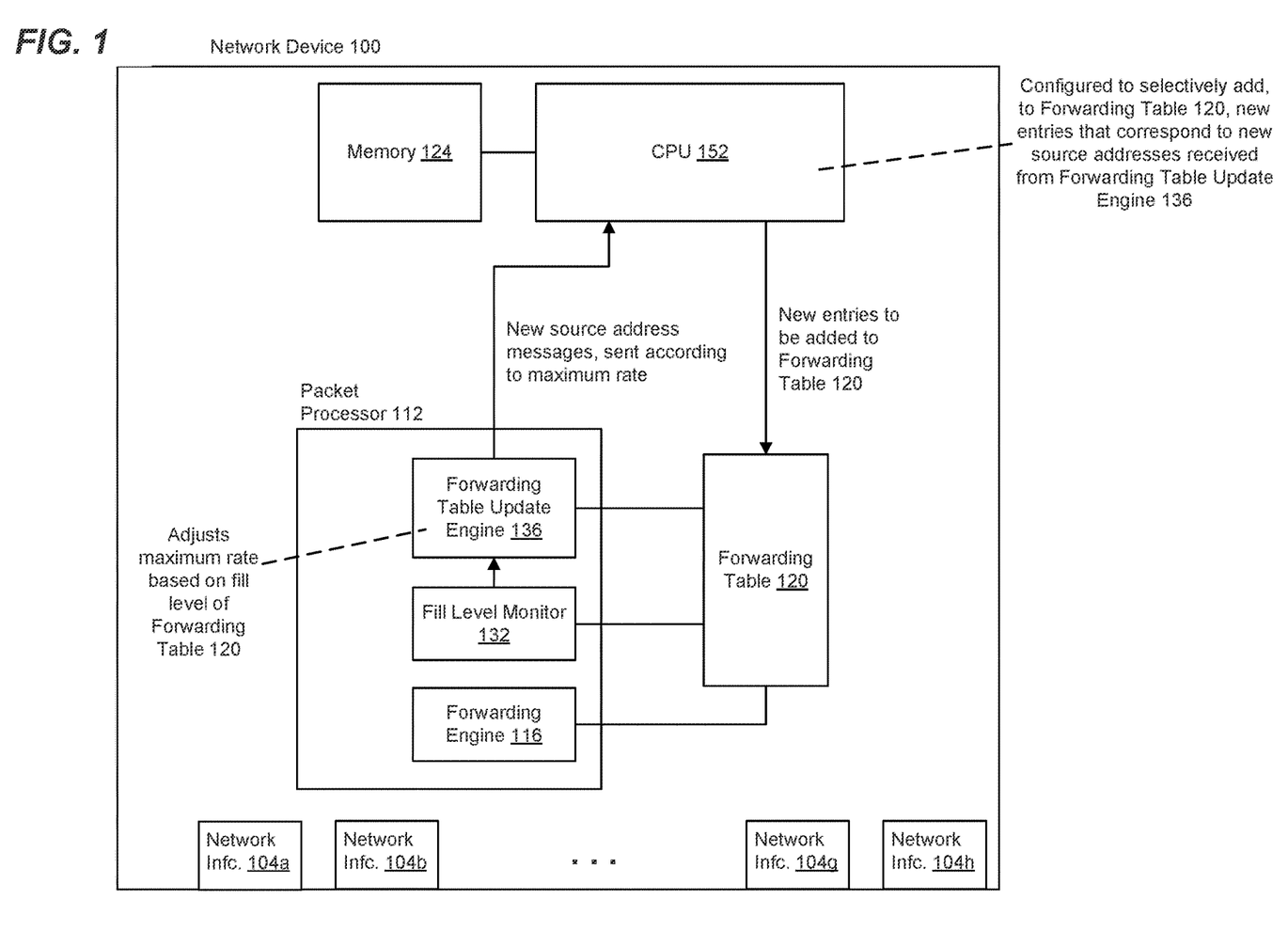
FIG. 1 is a simplified block diagram of an example network device in which a packet processor adjusts, based on a fill level of a forwarding table, a maximum rate at which the packet processor is permitted to send messages to a central processing unit (CPU) regarding network addresses that are to be added to the forwarding table, according to an embodiment.

FIG. 1 is a block diagram of an example network device 100 that receives packets, processes the packets to determine network links via which the packets are to be forwarded, and transmits the packets via the determined network links, according to an embodiment. The network device 100 includes a plurality of network interfaces 104 (e.g., ports, link aggregate groups (LAGs), tunnels, etc.) configured to couple to network links. In various embodiments, the network device 100 includes any suitable number of network interfaces 104.

The network device 100 also includes a packet processor 112 that is configured to process packets (e.g., by analyzing header information in the packets), in an embodiment. The packet processor 128 includes a forwarding engine 116 that is configured to analyze at least header information in packets to determine network interfaces 104 to which packets are to be forwarded for transmission (referred to herein as "target network interfaces"). The forwarding engine 116 is coupled to a forwarding table 120, which stores associations between network addresses and network interfaces 104. The forwarding engine 116 is configured to use at least a destination address in a header of a packet to perform a lookup in the forwarding table 120 to determine one or more target network interfaces 112 for the packet. When the forwarding table 120 does not include the destination address of the packet, the forwarding engine 116 determines that the packet is to be flooded to multiple network interfaces 104, according to an embodiment. For example, the forwarding engine 116 determines that the packet is to be flooded to a subset of the network interfaces 104 of the network device 100. For instance, the forwarding engine 116 determines that the packet is to be flooded to all network interfaces 104 of the network device 100 except the network interface 104 that received the packet, in an embodiment. As another example, the forwarding engine 116 determines that the packet is to be flooded to all network interfaces 104 corresponding to a virtual local area network (VLAN) identifier in the packet except the network interface 104 that received the packet, in an embodiment.

A forwarding table update engine 136 is also coupled to the forwarding table 120. The forwarding table update engine 136 is configured to determine whether entries corresponding to the source network addresses of packets received by the network device 100 are included in the forwarding table 120. For example, the forwarding table update engine 136 is configured to use at least a source address in a header of a packet to perform a lookup in the forwarding table 120 to determine whether the forwarding table 120 includes an entry corresponding to the source address.

Generally speaking, when the forwarding table update engine 136 determines that the forwarding table 120 does not include an entry corresponding to the source address, the forwarding table update engine 136 sends a message (sometimes referred to herein as a "new source address message") to a central processing unit (CPU) 152 indicating that the forwarding table update engine 136 identified a source address that is not in the forwarding table 120 (sometimes referred to herein as a "new source address"). The new source address message also includes an indicator of a network interface 104 that received the packet.

The CPU 152 is coupled to a memory 156 that stores machine readable instructions (e.g., software instructions, firmware instructions, etc.). The CPU 152 comprises a processor that is configured to execute machine readable instructions stored in the memory 156. When executed by the processor of the CPU 152, the machine readable instructions cause the CPU 152 to perform various acts describe herein. In other words, the CPU 152 is configured, in accordance with machine readable instructions, to perform various acts described herein.

In some embodiments, when the forwarding table update engine 136 determines that the forwarding table 120 does not include an entry corresponding to the source address, the forwarding table update engine 136 attempts to reserve space in the forwarding table 120 for a new entry corresponding the new source. In some such embodiments, the forwarding table update engine 136 generates the new source address message to include an indicator of whether the forwarding table update engine 136 was able to reserve space in the forwarding table 120. When the forwarding table update engine 136 is able to reserve space in the forwarding table 120, the new source address message is generated to include an indicator of the particular memory space in the forwarding table 120 that was reserved for the new entry corresponding to the new source address, according to an embodiment. Additionally or alternatively, when the forwarding table update engine 136 is unable to reserve space in the forwarding table 120, the new source address message is generated to include an indicator that the forwarding table update engine 136 was unable to reserve space in the forwarding table 120 for a new entry corresponding to the new source address, according to an embodiment.

The CPU 152 is configured to, in response to each of at least some new source address message received from the packet processor 112, attempt to add a corresponding entry in the forwarding table 120. When the forwarding table update engine 136 is able to reserve space in the forwarding table 120 for the new entry, adding the new entry to the forwarding table 120 by the CPU 152 is typically straightforward and the CPU 152 is able to add the entry quickly, using relatively little processing power.

As a fill level of the forwarding table 120 approaches capacity, however, the forwarding table update engine 136 faces increasing difficulty with reserving space in the forwarding table 120 for new entries. When the forwarding table update engine 136 is unable to reserve space for a new entry, the CPU 152 is configured to perform more complex operations in an attempt find and/or create space in the forwarding table 120 for new entries. As a straightforward example, the CPU 152 is configured to perform an aging procedure in which older entries in the forwarding table 120 are removed, thus creating space for new entries.

In some embodiments, the forwarding table comprises i) a content addressable memory (CAM), such as a ternary content addressable memory (TCAM), that stores patterns corresponding to network addresses, and ii) a separate memory, such as a random access memory (RAM), that stores forwarding information corresponding to the network addresses. Because CAM memories are relatively expensive and because network addresses can be relatively large (e.g., media access control (MAC) addresses have a length of 48 bits), the CAM does not store full network addresses but rather stores hashes of network addresses (sometimes referred to herein as "hash values"), in some embodiments.

Generating a hash value comprises applying a hashing function to the network address, in an embodiment.

Figure 2:
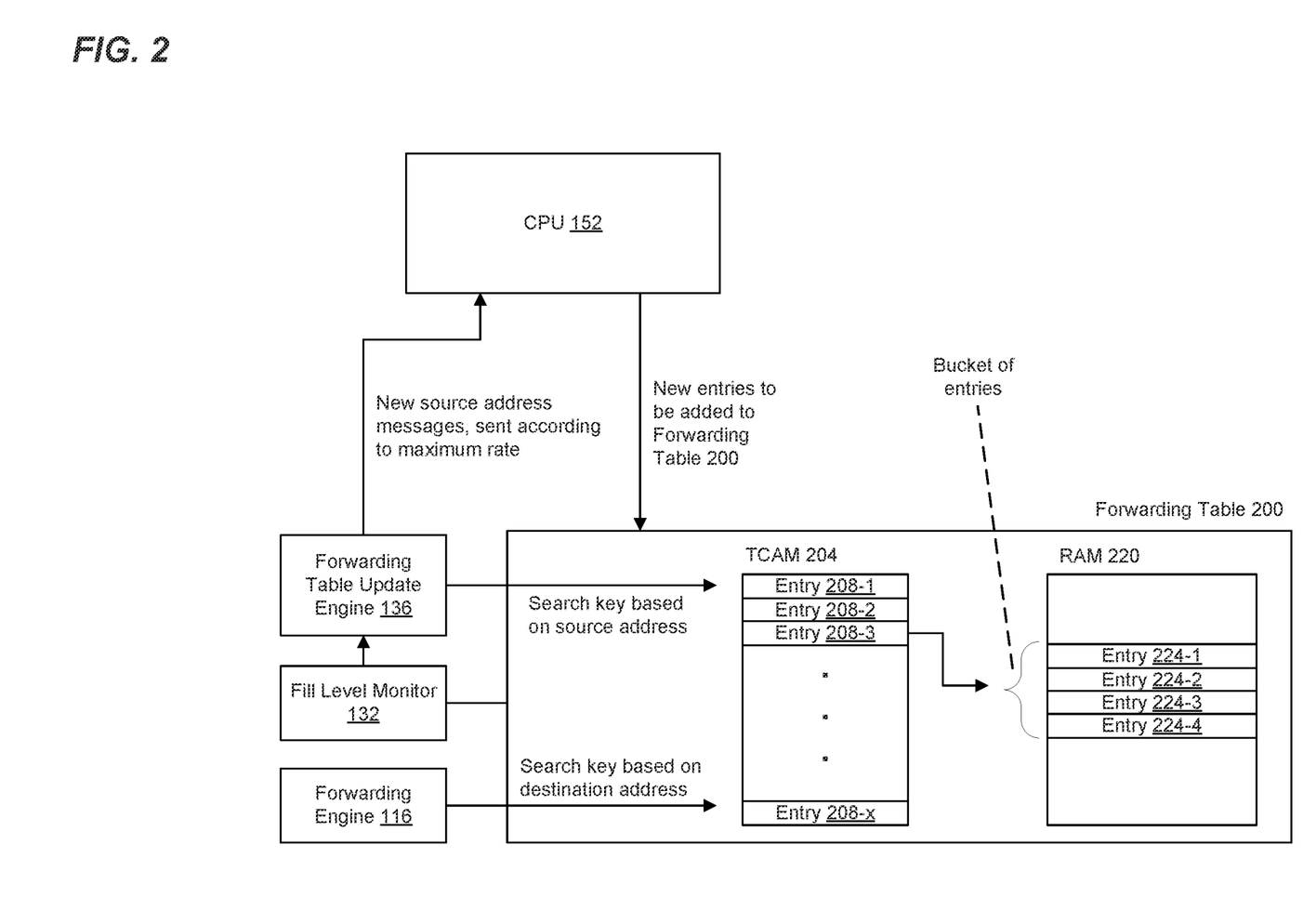
FIG. 2 is a simplified diagram illustrating an example forwarding table used in conjunction with elements of the packet processor of FIG. 1, according to an embodiment.

FIG. 2 is a diagram illustrating an example forwarding table 200 used in conjunction with the forwarding engine 116, the fill level monitor 132, the forwarding table update engine 136, and the CPU 152 of FIG. 1, according to an embodiment. In other embodiments, the network device 100 of FIG. 1 uses a suitable forwarding table that has a different structure than the forwarding table 200.

The forwarding table 200 includes a TCAM 204 having a plurality of entries 208. At least some of the entries 208 store hash values of network addresses.

The forwarding table 200 includes a RAM 220 that includes a plurality of entries. In an embodiment, each entry 208 in the TCAM 204 points to a set of multiple entries in the RAM 220, sometimes referred to herein as "buckets". For example, the entry 208-3 of the TCAM 204 points to a bucket of entries 224 in the RAM 220. Each entry in a bucket is sometimes referred to herein as a "bucket entry."

When a new entry corresponding to a source address/network interface association is to be stored in the forwarding table 200, the CPU 152 stores a hash value of the source address in an entry 208 of the TCAM 204 and also stores in a bucket of the RAM 220 pointed to by the entry 208 in the TCAM 204 i) the source address and ii) forwarding information (e.g., an indicator of a network interface) that corresponds to the source address. In some embodiments, the CPU 152 also stores other information in the bucket entry, such as aging information for use in performing an aging operation to remove old entries from the forwarding table 200. Examples of aging information include a time at which the entry was added to the forwarding table 200, a time-to-live for the entry, etc.

Typically, multiple different network addresses will hash to a same hash value. Thus, information corresponding to different network addresses may be stored in a single bucket in the RAM 220, i.e., respective information corresponding to different network addresses is stored in respective bucket entries within the bucket. When the bucket is full, no additional network addresses that hash to the same hash value corresponding to the bucket can be added to the forwarding table 200.

When the forwarding engine 116 is to determine forwarding information for a packet, the forwarding engine 116 generates a hash value using a destination address of the packet, generates a search key using the hash value, and applies the search key to the TCAM 204. If the TCAM 204 finds an entry 208 that matches the search key, the TCAM 204 returns a pointer to a bucket of entries in the RAM 200. The forwarding engine 116 then analyzes bucket entries corresponding to the pointer to determine if the destination address is stored in any of the bucket entries. If the destination address is stored in one of the bucket entries, the forwarding engine 116 retrieves the forwarding information from the one bucket entry and uses the forwarding information to make a forwarding decision regarding the packet.

When the forwarding table update engine 136 is to determine whether a source address of a packet is already stored in the forwarding table 200, the forwarding table update engine 136 generates a hash value using the source address, generates a search key using the hash value, and applies the search key to the TCAM 204. If the TCAM 204 finds an entry 208 that matches the search key, the TCAM 204 returns a pointer to a bucket of entries in the RAM 200. The forwarding table update engine 136 then analyzes bucket entries corresponding to the pointer to determine if the source address is stored in any of the bucket entries. If the source address is stored in one of the bucket entries, the forwarding table update engine 136 determines that the source address is already stored in the forwarding table 200. On the other hand, if the source address is not stored in one of the bucket entries, the forwarding table update engine 136 determines that the source address is not already stored in the forwarding table 200.

Additionally, if the bucket pointed to by the pointer includes an empty bucket entry, the forwarding table update engine 136 reserves the empty bucket entry for the new source address, according to an embodiment. On the other hand, if the bucket pointed to by the pointer does not include an empty bucket entry, the forwarding table update engine 136 determines that an entry in the forwarding table 200 for the new source address cannot be reserved, according to an embodiment.

If the TCAM 204 does not find an entry 208 that matches the search key, the forwarding table update engine 136 determines that the source address is not already stored in the forwarding table 200. Additionally, if the TCAM 204 is not full, the forwarding table update engine 136 reserves an empty entry 208 in the TCAM 204 for the new entry, according to an embodiment. On the other hand, if the TCAM 204 is full, the forwarding table update engine 136 determines that an entry in the forwarding table 200 for the new source address cannot be reserved, according to an embodiment.

The fill level monitor 132 determines fill level information for the forwarding table 200. The fill level information includes a fill level of the TCAM 204, in an embodiment. The fill level information additionally or alternatively includes a fill level of the RAM 220, in another embodiment. In another embodiment, the fill level monitor 132 generates a single fill level indicator using the fill level of the TCAM 204 and the fill level of the RAM 220, such as by mathematically combining the fill level of the TCAM 204 and the fill level of the RAM 220.

In other embodiments, the fill level monitor 132 monitors a rate at which the forwarding table update engine 136 determines that entries in the forwarding table 200 cannot be reserved, and generates a fill level indicator using at least the rate at which the forwarding table update engine 136 determines that entries in the forwarding table 200 cannot be reserved. For example, as the rate at which the forwarding table update engine 136 determines that entries in the forwarding table 200 cannot be reserved increases, this indicates that the fill level of the forwarding table 200 is increasing, according to some embodiments.

When the forwarding table update engine 136 is able to reserve an entry in the forwarding table 200 for a new entry, the CPU 152 merely stores new entry information in the reserved entry. For example, when the forwarding table update engine 136 reserves a bucket entry in the RAM 220 for a new source address, the CPU 152 stores the new source address and the forwarding information in the reserved bucket entry. As another example, when the forwarding table update engine 136 reserves a TCAM entry 208 in the RAM 220 for a new source address, the CPU 152 stores a hash value of the new source address in the reserved TCAM entry 208; additionally, the CPU 152 stores the new source address and the forwarding information in a bucket entry of the RAM 220 that corresponds to the reserved TCAM entry 208.

On the other hand, when the forwarding table update engine 136 is unable to reserve an entry in the forwarding table 200 because the TCAM 204 is full, the CPU 152 may attempt to create space in the TCAM 204 by performing a rehashing operation. In an embodiment, the rehashing operation includes generating new hash values for addresses stored in the forwarding table 200 using a new hash function. For example, the new hash function may tend to hash more addresses to same hash values, thus reducing the number of hash values in the TCAM 204 and creating space in the TCAM 204. The rehashing operation is computationally intensive and relatively time consuming because the CPU 152 generates new hash values for all of the addresses already stored in the forwarding table 200, and then stores the new hash values in the TCAM 204. Additionally, bucket entries in the RAM 220 must be rearranged within the RAM 220 to correspond with the new hash values in the TCAM 204.

When the forwarding table update engine 136 is unable to reserve an entry in the forwarding table 200 because a bucket in the RAM 220 is full, the CPU 152 may attempt to create space in the RAM 220 by performing a rehashing operation similar to the rehashing operation described as described above. For example, the new hash function may tend to hash less addresses to same hash values, thus reducing, in the aggregate, the number of addresses stored in each bucket. The rehashing operation is computationally intensive and relatively time consuming because the CPU 152 generates new hash values for all of the addresses already stored in the forwarding table 200, and then stores the new hash values in the TCAM 204. Additionally, bucket entries in the RAM 220 must be rearranged within the RAM 220 to correspond with the new hash values in the TCAM 204.

Additionally or alternatively, when the forwarding table update engine 136 is unable to reserve an entry in the forwarding table 200 because a bucket in the RAM 220 is full, the CPU 152 may attempt to create space in the RAM 220 by increasing a number of bucket entries in each of at least some buckets in the RAM 220. When increasing the number of bucket entries in each of at least some buckets, the locations of buckets in the RAM 220 are moved, according to an embodiment. Thus, the CPU 152 needs to rearrange bucket entries within the RAM 220 and needs to update pointers from TCAM entries 208 to the buckets in the RAM 220. Such operations to increase the bucket size are computationally intensive and relatively time consuming.

Moreover, when the forwarding table update engine 136 encounters a new source address but is unable to reserve an entry in the forwarding table 200 for the new source address, it is likely that the network device 100 will continue receiving packets having the new source address and thus the same new source address messages will continually be sent to the CPU 152 when the CPU 152 is already performing computationally intensive and time consuming operations in an attempt to free up space in the forwarding table 200, further increasing the share of the processing bandwidth of the CPU 152 being devoted to attempting to add new entries to the forwarding table 200 when the chances of the CPU 152 being successful are significantly decreasing.

Thus, the forwarding table update engine 136 is configured to adjust a maximum rate according to which the forwarding table update engine 136 is permitted to send new source address messages to the CPU 152 based on a fill level of the forwarding table 120/200. Generally, the forwarding table update engine 136 reduces the maximum rate as the fill level of the forwarding table 120/200. Accordingly, as the fill level of the forwarding table 120/200 increases and as the CPU 152 increases the performance of computationally intensive and time consuming operations in an attempt to free up space in the forwarding table 120/200, the forwarding table update engine 136 reduces the rate at which new source address messages are sent to the CPU 152 to prevent or reduce further increases in the share of the processing bandwidth of the CPU 152 being devoted to attempting to add new entries to the forwarding table 200 when the chances of the CPU 152 being successful are significantly decreasing.

Figure 3:
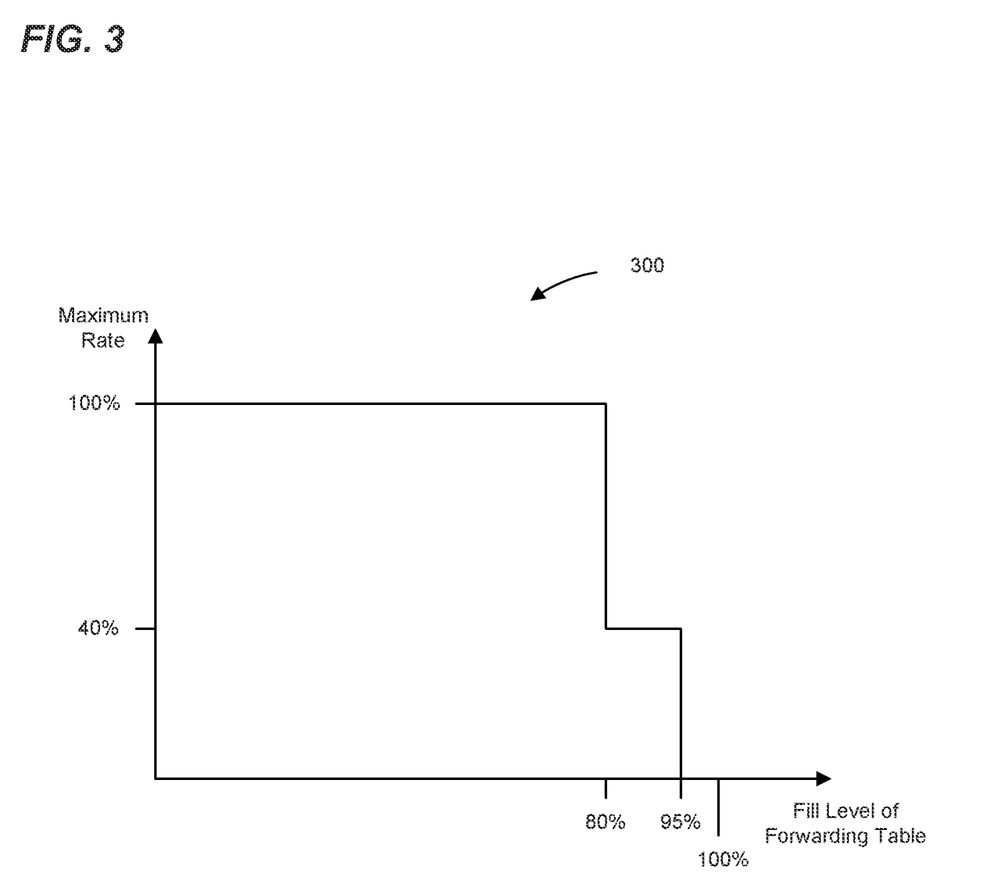
FIG. 3 is a plot illustrating an example adjustment of a maximum rate according to which messages are sent to a CPU based on a fill level of a forwarding table, according to an embodiment.

FIG. 3 is a plot 300 illustrating an example adjustment of the maximum rate according to which new source address messages are sent to a CPU based on a fill level of a forwarding table, according to an embodiment. In some embodiments, the forwarding table update engine 136 implements the maximum rate adjustment illustrated in FIG. 3 in connection with a fill level of the forwarding table 120 or of the forwarding table 200. FIG. 3 is described with reference to FIGS. 1 and 2 merely for explanatory purposes. In other embodiments, another suitable packet processor of another suitable network device implements the maximum rate adjustment illustrated in FIG. 3. In other embodiments, the forwarding table update engine 136 implements another suitable maximum rate adjustment different than the example of FIG. 3.

The vertical axis of the plot 300 corresponds to a percentage of a peak rate at which the forwarding table update engine 136 is capable of sending new source address messages to the CPU 152. The horizontal axis of the plot 300 corresponds to percentage of a maximum fill level of the forwarding table 120/200.

In the example depicted in FIG. 3, when the fill level of the forwarding table 120/200 is below 80%, the forwarding table update engine 136 is permitted to send new source address messages to the CPU 152 up to the peak rate. When the fill level of the forwarding table 120/200 is between 80% and 95%, the forwarding table update engine 136 is permitted to send new source address messages to the CPU 152 up to 40% of the peak rate. When the fill level of the forwarding table 120/200 is above 95%, the forwarding table update engine 136 is prevented from sending any new source address messages to the CPU 152, i.e., the maximum rate is 0% of the peak rate.

In an embodiment, the forwarding table update engine 136 is configured to compare the fill level of the forwarding table 120/200 to a first threshold (e.g., 80%) and/or a second threshold (e.g., 95%), and to determine the maximum rate based on the comparison of the fill level of the forwarding table 120/200 to the first threshold and/or the second threshold. For example, when fill level of the forwarding table 120/200 is below the first threshold (e.g., 80%), the forwarding table update engine 136 is permitted to send new source address messages to the CPU 152 up to the peak rate. When the fill level of the forwarding table 120/200 is above the first threshold (e.g., 80%) and below the second threshold (e.g., 95%), the forwarding table update engine 136 is permitted to send new source address messages to the CPU 152 up to 40% of peak rate. When the fill level of the forwarding table 120/200 is above the second threshold (e.g., 95%), the forwarding table update engine 136 is prevented from sending any new source address messages to the CPU 152, i.e., the maximum rate is 0% of the peak rate.

Although FIG. 3 was described in the context of illustrative fill level thresholds (e.g., 80% and 95%) and illustrative maximum rate percentages (e.g., 100%, 40%, and 0%), in other embodiments other suitable thresholds and/or other suitable maximum rate percentages are used. Additionally, in other embodiments, more than two fill level thresholds and/or more than three maximum rate percentages are used.

Figure 4:
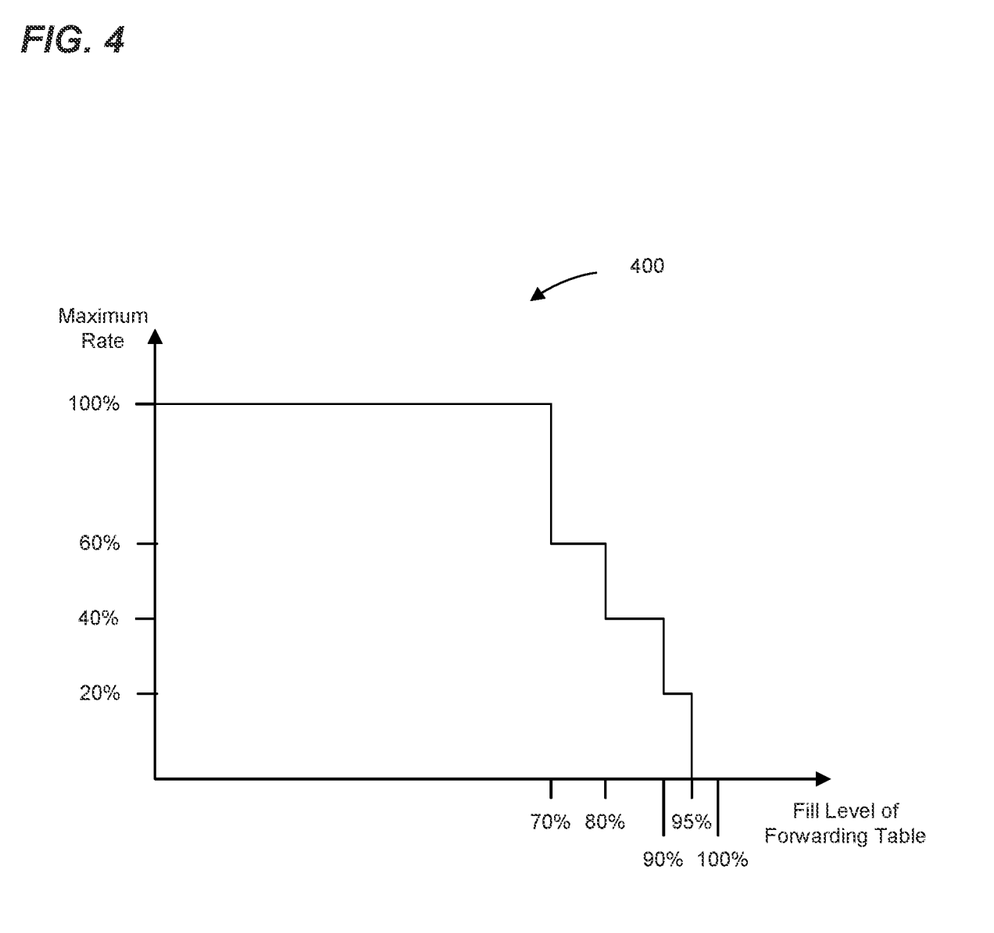
FIG. 4 is a plot illustrating another example adjustment of a maximum rate according to which messages are sent to a CPU based on a fill level of a forwarding table, according to another embodiment.

FIG. 4 is a plot 400 illustrating another example adjustment of the maximum rate according to which new source address messages are sent to a CPU based on a fill level of a forwarding table, according to an embodiment. In some embodiments, the forwarding table update engine 136 implements the maximum rate adjustment illustrated in FIG. 4 in connection with a fill level of the forwarding table 120 or of the forwarding table 200. FIG. 4 is described with reference to FIGS. 1 and 2 merely for explanatory purposes. In other embodiments, another suitable packet processor of another suitable network device implements the maximum rate adjustment illustrated in FIG. 4. In other embodiments, the forwarding table update engine 136 implements another suitable maximum rate adjustment different than the example of FIG. 4.

The vertical axis of the plot 400 corresponds to a percentage of a peak rate at which the forwarding table update engine 136 is capable of sending new source address messages to the CPU 152. The horizontal axis of the plot 400 corresponds to percentage of a maximum fill level of the forwarding table 120/200.

When the fill level of the forwarding table 120/200 is below 70%, the forwarding table update engine 136 is permitted to send new source address messages to the CPU 152 up to the peak rate. When the fill level of the forwarding table 120/200 is between 70% and 80%, the forwarding table update engine 136 is permitted to send new source address messages to the CPU 152 up to 60% of the peak rate. When the fill level of the forwarding table 120/200 is between 80% and 90%, the forwarding table update engine 136 is permitted to send new source address messages to the CPU 152 up to 40% of the peak rate. When the fill level of the forwarding table 120/200 is between 90% and 95%, the forwarding table update engine 136 is permitted to send new source address messages to the CPU 152 up to 20% of the peak rate. When the fill level of the forwarding table 120/200 is above 95%, the forwarding table update engine 136 is prevented from sending any new source address messages to the CPU 152, i.e., the maximum rate is 0% of the peak rate.

In an embodiment, the forwarding table update engine 136 is configured to compare the fill level of the forwarding table 120/200 to a first threshold (e.g., 70%), a second threshold (e.g., 80%), a third threshold (e.g., 90%), and/or a fourth threshold (e.g., 95%), and to determine the maximum rate based on the comparison of the fill level of the forwarding table 120/200 to the first threshold, the second threshold, the third threshold, and/or the fourth threshold. For example, when fill level of the forwarding table 120/200 is below the first threshold (e.g., 70%), the forwarding table update engine 136 is permitted to send new source address messages to the CPU 152 up to the peak rate. When the fill level of the forwarding table 120/200 is above the first threshold (e.g., 70%) and below the second threshold (e.g., 80%), the forwarding table update engine 136 is permitted to send new source address messages to the CPU 152 up to 60% of peak rate. When the fill level of the forwarding table 120/200 is above the second threshold (e.g., 80%) and below the third threshold (e.g., 90%), the forwarding table update engine 136 is permitted to send new source address messages to the CPU 152 up to 40% of peak rate. When the fill level of the forwarding table 120/200 is above the third threshold (e.g., 90%) and below the fourth threshold (e.g., 95%), the forwarding table update engine 136 is permitted to send new source address messages to the CPU 152 up to 20% of peak rate. When the fill level of the forwarding table 120/200 is above the fourth threshold (e.g., 95%), the forwarding table update engine 136 is prevented from sending any new source address messages to the CPU 152, i.e., the maximum rate is 0% of the peak rate.

Although FIG. 4 was described in the context of illustrative fill level thresholds (e.g., 70%, 80%, 90%, and 95%) and illustrative maximum rate percentages (e.g., 100%, 60%, 40%, 20%, and 0%), in other embodiments other suitable thresholds and/or other suitable maximum rate percentages are used. Additionally, in other embodiments, a suitable number of fill level thresholds different than four and/or a suitable number of maximum rate percentages different than five are used.

Referring again to FIGS. 1 and 2, the forwarding table 120 and/or the forwarding table 200 are MAC address tables that store MAC addresses. For example, the forwarding engine 116 comprises a Layer-2 forwarding engine that makes forwarding decisions for packets based on at least MAC destination addresses in the packets, in some embodiments. In other embodiments, the forwarding table 120 and/or the forwarding table 200 store other suitable types of network addresses different than MAC addresses.

Figure 5:
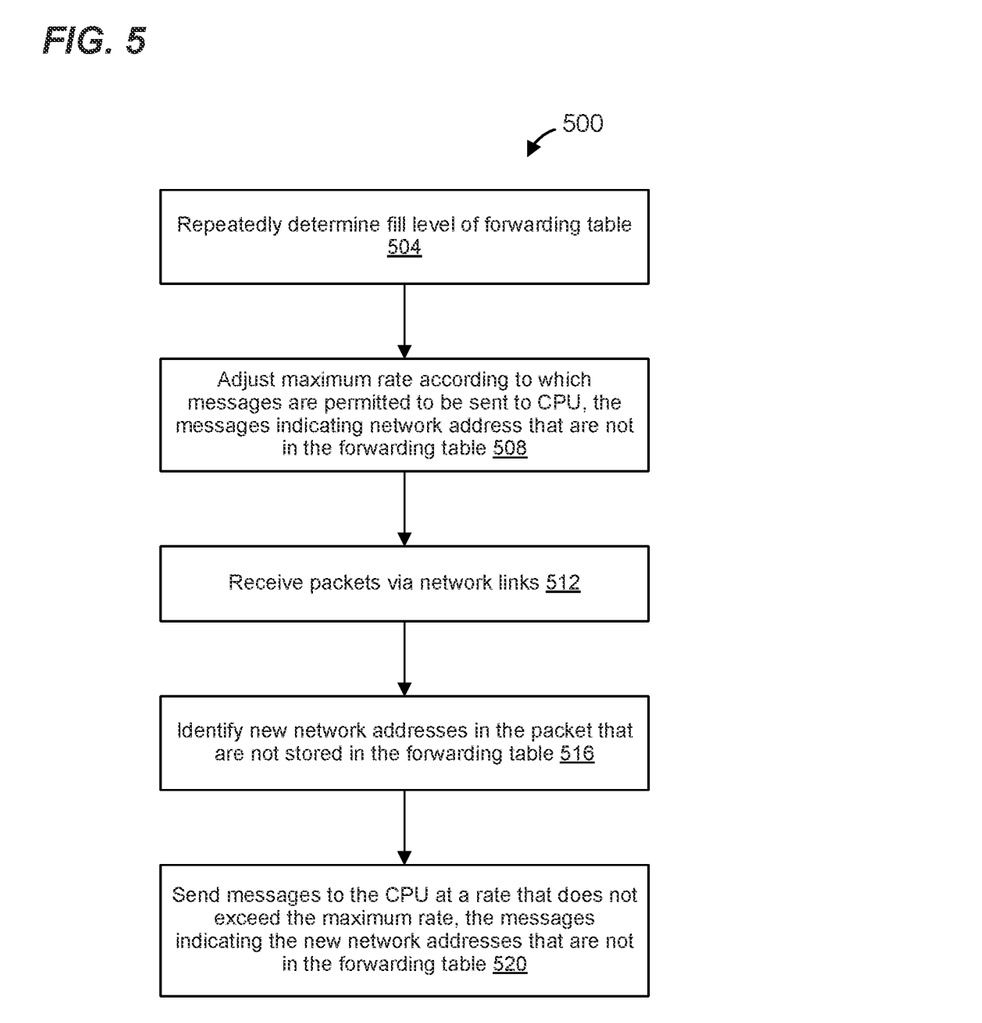
FIG. 5 is a flow diagram of an example method for populating a forwarding table of a network device, according to an embodiment.

FIG. 5 is a flow diagram of an example method 500 for populating a forwarding table of a network device, according to an embodiment. The method 500 is implemented by the network device 100 of FIG. 1 and/or by the network device elements of FIG. 2, according to an embodiment, and the method 500 is described with reference to FIGS. 1 and 2 merely for illustrative purposes. In other embodiments, the method 500 is implemented by another suitable network device different than the network device 100 of FIG. 1 and the network device elements of FIG. 2. Additionally, the network device 100 of FIG. 1 and/or by the network device elements of FIG. 2 implement other suitable methods for populating the forwarding table 120/200 different than the example method 500.

At block 504, a packet processor of a network device repeatedly determines a fill level of a forwarding table of the network device. The forwarding table is configured to store forwarding information for use by the packet processor for forwarding packets to network interfaces of the network device. The forwarding information includes associations between respective network addresses and respective network interfaces. In an embodiment, the forwarding table is configured to store network addresses that are learned by the packet processor.

The packet processor 112 continuously monitors or repeatedly determines (e.g., the fill level monitor 132 continuously monitors or repeatedly determines) a fill level of the forwarding table 120, the forwarding table 200, or another suitable forwarding table, according to various embodiments.

At block 508, the packet processor adjusts a maximum rate according to which the packet processor is permitted to send messages to a CPU coupled to the packet processor based at least on the fill level of the forwarding table, the messages indicating network addresses not stored in the forwarding table. In an embodiment, the messages indicate network addresses that are to be learned by the CPU by the CPU storing new entries in the forwarding table that correspond to the network addresses indicated by the messages.

The packet processor 112 adjusts (e.g., the forwarding table update engine 136 adjusts) the maximum rate according to which the packet processor 112 is permitted to send (e.g., the forwarding table update engine 136 is permitted to send) new source address messages to the CPU 152, according to an embodiment.

In an embodiment, adjusting the maximum rate at block 508 comprises reducing the maximum rate as the fill level of the forwarding table increases.

In an embodiment, adjusting the maximum rate at block 508 comprises using a first maximum rate when the fill level is below a threshold; and using a second maximum rate when the fill level is above the threshold, wherein the second maximum rate is lower than the first maximum rate.

In an embodiment, adjusting the maximum rate at block 508 comprises using a first maximum rate when the fill level is below a threshold; and using a second maximum rate when the fill level is above the threshold, wherein the second maximum rate is lower than the first maximum rate.

In an embodiment, adjusting the maximum rate at block 508 comprises: using the first maximum rate when the fill level is below a first threshold; using the second maximum rate when the fill level is above the first threshold and below a second threshold; and using a third maximum rate when the fill level is above the second threshold, wherein the third maximum rate is zero so that the sending of the message by the packet processor to the CPU is suspended when the fill level is above the second threshold.

At block 512, the packet processor receives packets via network links coupled to the network device. For example, the packet processor 112 receives packets via network links coupled to the network interfaces 104, in an embodiment.

At block 516, the packet processor identifies new network addresses of the packets that are not in the forwarding table. For example, the packet processor 112 identifies (e.g., the forwarding table update engine 136 identifies) new network addresses of the packets that are not in the forwarding table 120 or the forwarding table 200, according to various embodiments. Identifying whether a network address of a packet packets is in the forwarding table at block 516 comprises generating a search key using a source address of the packet, and using the search key to perform a lookup in the forwarding table, in some embodiments. In some such embodiments, when the forwarding table indicates that the search key does not match any entries in the forwarding table, the packet processor determines (e.g., the forwarding table update engine 136 determines) that the source address of the packet is not in the forwarding table.

At block 520, the packet processor sends messages to the CPU at a rate that does not exceed the maximum rate, the messages indicating the new network addresses identified at block 516 are not stored in the forwarding table. In an embodiment, the CPU is configured to, in response to the messages sent by the packet processor at block 520, selectively add new entries to the forwarding table that correspond to at least some new network addresses in the messages.

The packet processor 112 sends (e.g., the forwarding table update engine 136 sends) new source address messages to the CPU 152 at a rate that does not exceed the maximum rate, according to an embodiment.

In an embodiment, when the maximum rate is adjusted to zero, the method 500 comprises suspending the sending of messages to the CPU while the maximum rate is set to zero.

Referring again to FIG. 1, to further reduce the number of new address messages that the packet processor 112 sends to the CPU 152 at least when the fill level of the forwarding table 120/200 is relatively high, the packet processor 112 optionally is configured to refrain from sending to the CPU 152 multiple new source address messages corresponding to the same new source address within a relatively short period of time. For example, in connection with the packet processor 112 sending a new source address message to the CPU 152, the packet processor 112 is configured to (e.g., the forwarding table update engine 136 is configured to) record the new source address message (or a new source address in the message) in a cache.

When a subsequent new source address message is to be sent to the CPU 152, the packet processor 112 first checks (e.g., the forwarding table update engine 136 checks) whether a matching new source address message is stored in the cache. When the packet processor 112 determines (e.g., the forwarding table update engine 136 determines) that a matching new source address message is stored in the cache, the subsequent new source address message is not sent to the CPU 152 and is discarded. On the other hand, when the packet processor 112 determines (e.g., the forwarding table update engine 136 determines) that a matching new source address message is not stored in the cache, the subsequent new source address message is sent to the CPU 152 and also records the subsequent new source address message in the cache.

Figure 6A:
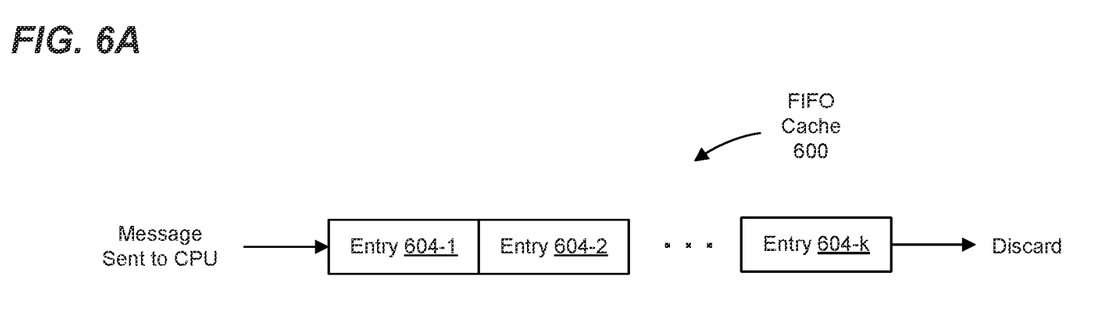
FIG. 6A is a simplified block diagram of an example cache that a packet processor uses to reduce a number of new address messages that the packet processor sends to a CPU, according to an embodiment.

FIG. 6A is a simplified block diagram of an example cache 600 that a packet processor uses to reduce a number of new address messages that the packet processor sends to a CPU, according to an embodiment. The cache 600 is included in the packet processor 112 (e.g., in the forwarding table update engine 136), according to an embodiment. FIG. 6A is described with reference to FIG. 1 merely for illustrative purposes. In other embodiments, the cache 600 is included in another suitable network device different than the network device 100 of FIG. 1. Additionally, the network device 100 of FIG. 1 does not include the cache 600, according to some embodiments.

The cache 600 includes a plurality of elements 604 arranged as a first in, first out (FIFO) cache. The cache 600 stores in the elements 604 copies of new source address messages that a packet processor of a network device previously sent to a CPU of the network device. For example, the cache 600 stores copies of new source address messages that the packet processor 112 previously sent (e.g., the forwarding table update engine 136 previously sent) to the CPU 152.

When another new source address message is to be sent to the CPU, the other new source address message is compared to previously sent new source address messages stored in the FIFO cache 600. If the other new source address message matches one of the previously sent new source address messages stored in the FIFO cache 600, the other new source address message is discarded and is not sent to the CPU.

On the other hand, if the other new source address message does not match any of the previously sent new source address messages stored in the FIFO cache 600, the other new source address message is sent to the CPU. Additionally, a copy of the other new source address message is added to the FIFO cache 600. Further, if the FIFO cache 600 was already full, an oldest element 604 of the FIFO cache 600 is discarded.

Figure 6B:
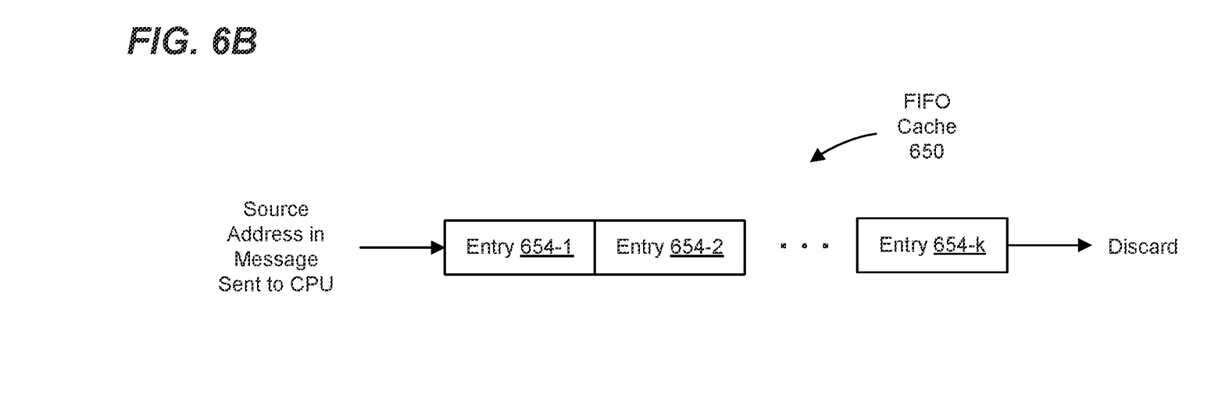
FIG. 6B is a simplified block diagram of another example cache that a packet processor uses to reduce a number of new address messages that the packet processor sends to a CPU, according to another embodiment.

FIG. 6B is a simplified block diagram of another example cache 650 that a packet processor uses to reduce a number of new address messages that the packet processor sends to a CPU, according to another embodiment. The cache 650 is included in the packet processor 112 (e.g., in the forwarding table update engine 136), according to an embodiment. FIG. 6B is described with reference to FIG. 1 merely for illustrative purposes. In other embodiments, the cache 650 is included in another suitable network device different than the network device 100 of FIG. 1. Additionally, the network device 100 of FIG. 1 does not include the cache 650, according to some embodiments.

The cache 650 includes a plurality of elements 654 arranged as a FIFO cache. The cache 650 stores in the elements 654 copies of new source addresses of new source address messages that a packet processor of a network device previously sent to a CPU of the network device. For example, the cache 650 stores new source addresses that were included in new source address messages that the packet processor 112 previously sent (e.g., the forwarding table update engine 136 previously sent) to the CPU 152.

When another new source address message is to be sent to the CPU, a new source address within the other new source address message is compared to previously sent new source addresses stored in the FIFO cache 650. If the new source address within the other new source address message matches one of the previously sent new source addresses stored in the FIFO cache 650, the other new source address message is discarded and is not sent to the CPU.

On the other hand, if the new source address within the other new source address message does not match any of the previously sent new source addresses stored in the FIFO cache 650, the other new source address message is sent to the CPU. Additionally, the new source address that was included in the other new source address message is added to the FIFO cache 650. Further, if the FIFO cache 650 was already full, an oldest element 654 of the FIFO cache 650 is discarded.

Figure 7:
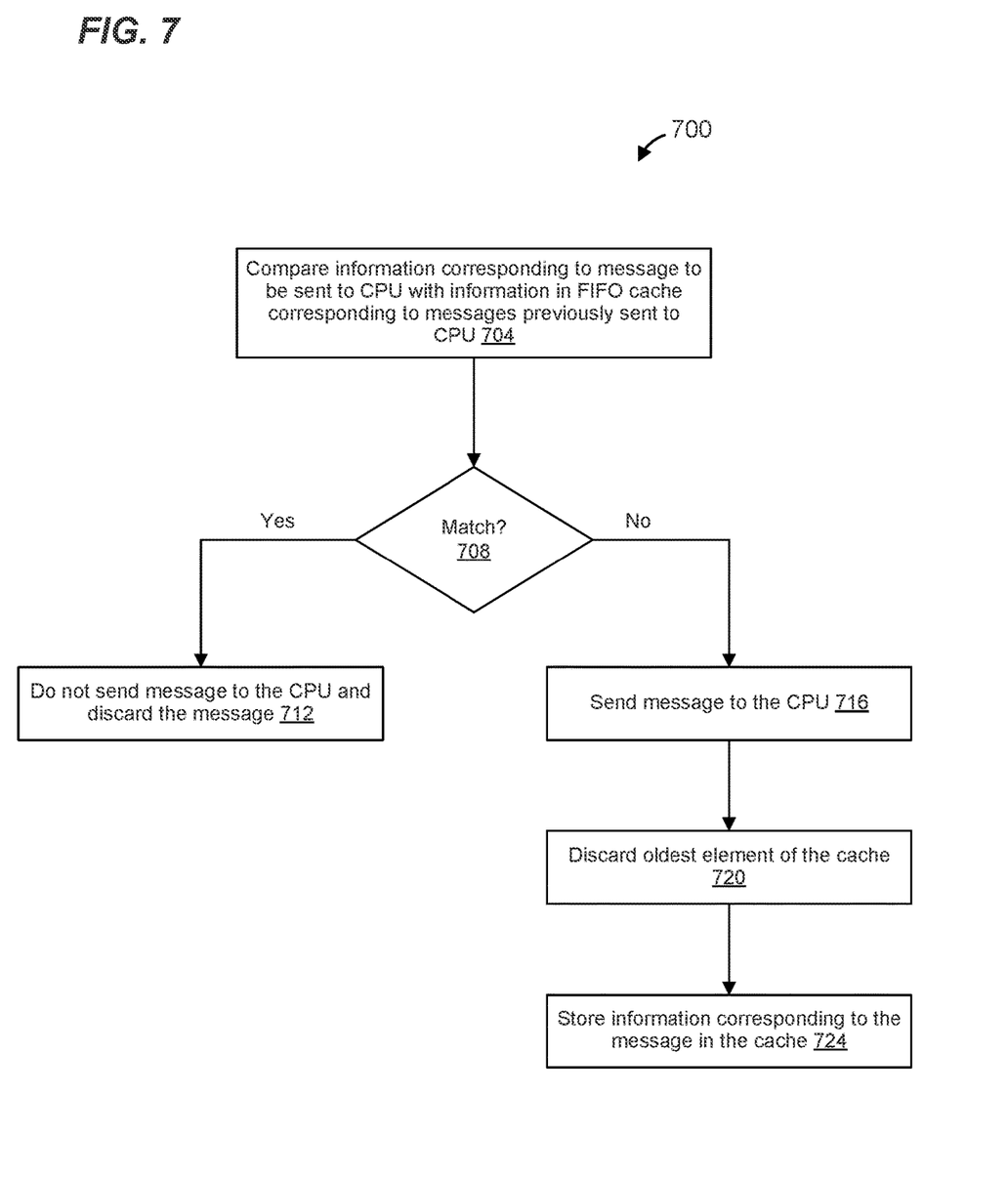
FIG. 7 is a flow diagram of an example method for reducing a number of messages that a packet processor sends to a CPU, the messages corresponding to new source addresses to be added to a forwarding table by the CPU, according to an embodiment.

FIG. 7 is a flow diagram of an example method 700 for reducing a number of messages that a packet processor sends to a CPU, the messages corresponding to new source addresses to be added to a forwarding table by the CPU, according to an embodiment. The method 700 is implemented by the network device 100 of FIG. 1 and/or by the network device elements of FIG. 2, according to an embodiment, and the method 700 is described with reference to FIGS. 1 and 2 merely for illustrative purposes. In other embodiments, the method 700 is implemented by another suitable network device different than the network device 100 of FIG. 1 and the network device elements of FIG. 2. Additionally, the network device 100 of FIG. 1 and/or by the network device elements of FIG. 2 do not implement the method 700 and/or implement other suitable methods for reducing a number of messages that a packet processor sends to a CPU different than the example method 700.

The method 700 is using the FIFO cache 600 of FIG. 6A or the FIFO cache 650 of FIG. 6B, according to some embodiments, and the method 700 is described with reference to FIGS. 6A and 6B merely for illustrative purposes. In other embodiments, the method 700 is implemented using a suitable FIFO cache different than the FIFO cache 600 of FIG. 6A and the FIFO cache 650 of FIG. 6B.

At block 704, the packet processor compares information corresponding to a message that is to be sent to the CPU with information in a cache that corresponds to messages previously sent to the CPU. The messages correspond to new source addresses that are to be added to a forwarding table by the CPU. In an embodiment, the cache stores messages that were previously sent to the CPU by the packet processor, and comparing the information at block 704 comprises comparing the message that is to be sent to the CPU with previously sent messages in the cache. In another embodiment, the cache stores source addresses that were within messages that were previously sent to the CPU by the packet processor, and comparing the information at block 704 comprises comparing a new source address within the message that is to be sent to the CPU with source addresses stored in the cache.

In an embodiment, the cache is a FIFO cache (e.g., the FIFO cache 600, the FIFO cache 650, or another suitable FIFO cache).

In an embodiment, the packet processor 112 compares (e.g., the forwarding table update engine 136 compares) the information corresponding to the message that is to be sent to the CPU with the information in the cache.

If the packet processor determines at block 708 that the information corresponding to the message that is to be sent to the CPU matches information in the cache, the flow proceeds to block 712. At block 712, the packet processor does not send the message to the CPU and discards the message. For example, the packet processor 112 does not send (e.g., the forwarding table update engine 136 does not send) the message to the CPU 152, and the packet processor 112 discards (e.g., the forwarding table update engine 136 discards) the message.

On the other hand, if the packet processor determines at block 708 that the information corresponding to the message that is to be sent to the CPU does not match any information in the cache, the flow proceeds to block 716. At block 716, the packet processor sends the message to the CPU. For example, the packet processor 112 sends (e.g., the forwarding table update engine 136 sends) the message to the CPU 152.

At block 720, at least when the cache is full, an oldest element in the cache is discarded. For example, the packet processor 112 discards (e.g., the forwarding table update engine 136 discards) the oldest element in the cache.

At block 724, the packet processor stores information corresponding to the message sent to the CPU at block 716 in the cache. In an embodiment in which the cache stores copies of messages previously sent to the CPU, the packet processor stores a copy of the message sent to the CPU at block 716 in the cache. In an embodiment in which the cache stores source addresses within messages previously sent to the CPU, the packet processor stores the source address within the message sent to the CPU at block 716 in the cache.

For example, the packet processor 112 stores (e.g., the forwarding table update engine 136 stores) the information corresponding to the message sent to the CPU at block 716 in the cache.

Embodiment 1: A network device, comprising: a memory configured to store a forwarding table that includes associations between network addresses and network interfaces of, or coupled to, the network device; and a packet processor configured to process packets received via the network interfaces and to determine, using the forwarding database, network interfaces to which the packets are to be forwarded for transmission. The packet processor includes: a fill level monitor configured to determine a fill level of the forwarding table; and a forwarding table updating engine. The forwarding table updating engine is configured to: adjust, based on the fill level of the forwarding table, a maximum rate according to which the packet processor is permitted to send messages to a central processing unit (CPU) coupled to the packet processor, the messages indicating network addresses that are to be stored in the forwarding table by the CPU; identify new network addresses of packets received via the network interfaces that are not in the forwarding table; and send to the CPU, at a rate that does not exceed the maximum rate, messages that indicate the new network addresses are to be added to the forwarding table, the CPU being configured to selectively add the new network addresses to the forwarding table.

Embodiment 2: The network device of embodiment 1, wherein the forwarding database updating engine is configured to: reduce the maximum rate as the fill level of the forwarding table increases.

Embodiment 3: The network device of embodiment 2, wherein the forwarding database updating engine is configured to: use a first maximum rate when the fill level of the forwarding table is below a threshold; and use a second maximum rate when the fill level of the forwarding table is above the threshold, wherein the second maximum rate is lower than the first maximum rate.

Embodiment 4: The network device of embodiment 3, wherein the forwarding database updating engine is configured to: use the first maximum rate when the fill level of the forwarding table is below a first threshold; use the second maximum rate when the fill level of the forwarding table is above the first threshold and below a second threshold; and use a third maximum rate when the fill level of the forwarding table is above the second threshold, wherein the third maximum rate is lower than the second maximum rate.

Embodiment 5: The network device of embodiment 4, wherein: the forwarding database updating engine is configured to use a maximum rate of zero when the fill level is above the second threshold so that the sending of new network addresses by the forwarding database updating engine to the CPU is suspended.

Embodiment 6: The network device of any of embodiments 1-5, wherein: the forwarding table comprises a content addressable memory (CAM) that is configured to store network address information; and the fill level monitor is configured to determine the fill level of the forwarding table based on a fill level of the CAM.

Embodiment 7: The network device of embodiment 6, wherein: the forwarding table further comprises a random access memory (RAM) separate from the CAM, the RAM being configured to store forwarding information corresponding to network address information stored in the CAM; and the fill level monitor is configured to determine the fill level of the forwarding table further based on a fill level of the RAM.

Embodiment 8: The network device of any of embodiments 1-7, wherein: the forwarding database updating engine is configured to, in response to identifying a new network address of a packet that is not in the forwarding table, determine whether an entry in the forwarding table can be reserved for the new network address; and the fill level monitor is configured to: monitor a rate at which the forwarding table update engine determines that entries in the forwarding table cannot be reserved, and determine the fill level of the forwarding table using at least the rate at which the forwarding table update engine determines that entries in the forwarding table cannot be reserved.

Embodiment 9: The network device of any of embodiments 1-8, wherein: the forwarding database updating engine comprises a cache for storing information corresponding to messages previously sent to CPU by the packet processor, the messages indicating network addresses that are to be added to the forwarding table; and the forwarding database updating engine is further configured to: compare information corresponding to a new message that is to be sent to CPU with information in the cache corresponding to messages previously sent to CPU, and when the information corresponding to the new message that is to be sent to CPU matches information in the cache, discard the new message without sending the new message to the CPU.

Embodiment 10: The network device of embodiment 9, wherein the forwarding database updating engine is further configured to, when the information corresponding to the new message that is to be sent to CPU does not match any information in the cache: send the new message to the CPU; and store the information corresponding to the new message in the cache.

Embodiment 11: A method for populating a forwarding table of a network device, the method comprising: repeatedly determining, at a packet processor, a fill level of a forwarding table that is populated with associations between network addresses and network interfaces of, or coupled to, the network device; adjusting, by the packet processor and based on the fill level of the forwarding table, a maximum rate according to which the packet processor is permitted to send messages to a central processing unit (CPU) coupled to the packet processor, the messages indicating network addresses that are to be stored in the forwarding table by the CPU; receiving, at the packet processor of the network device, packets via network links coupled to the network device; identifying, at the packet processor, new network addresses of the packets that are not in the forwarding table; and sending, by the packet processor, messages to the CPU at a rate that does not exceed the maximum rate, the messages indicating the new network addresses are to be added to the forwarding table, the CPU being configured to selectively add the new network addresses to the forwarding table.

Embodiment 12: The method for populating the forwarding table of embodiment 11, wherein adjusting the maximum rate according to which the packet processor sends messages to the CPU based on the fill level of the forwarding table comprises: reducing the maximum rate as the fill level of the forwarding table increases.

Embodiment 13: The method for populating the forwarding table of embodiment 12, wherein reducing the maximum rate level as the fill level increases comprises: using a first maximum rate when the fill level is below a threshold; and using a second maximum rate when the fill level is above the threshold, wherein the second maximum rate is lower than the first maximum rate.

Embodiment 14: The method for populating the forwarding table of embodiment 13, wherein reducing the maximum rate level as the fill level increases comprises: using the first maximum rate when the fill level is below a first threshold; using the second maximum rate when the fill level is above the first threshold and below a second threshold; and using a third maximum rate when the fill level is above the second threshold, wherein the third maximum rate is lower than the second maximum rate.

Embodiment 15: The method for populating the forwarding table of embodiment 14, wherein using the third maximum rate when the fill level is above the second threshold comprises: using a maximum rate of zero so that the sending of new network addresses by the packet processor to the CPU is suspended when the fill level is above the second threshold.

Embodiment 16: The method for populating the forwarding table of any of embodiments 11-15, wherein: the forwarding table comprises a content addressable memory (CAM) that is configured to store network address information; and repeatedly determining the fill level of the forwarding table comprises repeatedly determining the fill level of the forwarding table based on a fill level of the CAM.

Embodiment 17: The method for populating the forwarding table of embodiment 16, wherein: the forwarding table further comprises a random access memory (RAM) separate from the CAM, the RAM being configured to store forwarding information corresponding to network address information stored in the CAM; and repeatedly determining the fill level of the forwarding table comprises repeatedly determining the fill level of the forwarding table further based on a fill level of the RAM.

Embodiment 18: The method for populating the forwarding table of any of embodiments 11-17, further comprising: in response to identifying a new network address of a packet that is not in the forwarding table, determining, at the packet processor, whether an entry in the forwarding table can be reserved for the new network address; and monitoring, at the packet processor, a rate at which the packet processor determines that entries in the forwarding table cannot be reserved; wherein repeatedly determining the fill level of the forwarding table comprises repeatedly determining the fill level of the forwarding table using at least the rate at which the packet processor determines that entries in the forwarding table cannot be reserved.

Embodiment 19: The method for populating the forwarding table of any of embodiments 11-18, further comprising: comparing, at the packet processor, information corresponding to a new message that is to be sent to CPU with information in a cache corresponding to messages previously sent to CPU, the messages indicating network addresses that are to be added to the forwarding table; and when the packet processor determines that information corresponding to the new message that is to be sent to CPU matches information in the cache, discarding, by the packet processor, the new message without sending the new message to the CPU.

Embodiment 20: The method for populating the forwarding table of embodiment 19, wherein, when the packet processor determines that the information corresponding to the new message that is to be sent to CPU does not match any information in the cache: sending, by the packet processor, the new message to the CPU; and storing the information corresponding to the new message in the cache.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such a read-only memory (ROM), a random-access memory (RAM), etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A network device, comprising:
  a memory configured to store a forwarding table that includes associations between network addresses and network interfaces of, or coupled to, the network device; and
  a packet processor configured to process packets received via the network interfaces and to determine, using the forwarding database, network interfaces to which the packets are to be forwarded for transmission, the packet processor including:
  a fill level monitor configured to determine a fill level of the forwarding table, and
  a forwarding table updating engine configured to:
    adjust, based on the fill level of the forwarding table, a maximum rate according to which the packet processor is permitted to send messages to a central processing unit (CPU) coupled to the packet processor, the messages indicating network addresses that are to be stored in the forwarding table by the CPU,
    identify new network addresses of packets received via the network interfaces that are not in the forwarding table, and
    send to the CPU, at a rate that does not exceed the maximum rate, messages that indicate the new network addresses are to be added to the forwarding table, the CPU being configured to selectively add the new network addresses to the forwarding table.

2. The network device of claim 1, wherein the forwarding database updating engine is configured to:
  reduce the maximum rate as the fill level of the forwarding table increases.

3. The network device of claim 2, wherein the forwarding database updating engine is configured to:
  use a first maximum rate when the fill level of the forwarding table is below a threshold; and
  use a second maximum rate when the fill level of the forwarding table is above the threshold, wherein the second maximum rate is lower than the first maximum rate.

4. The network device of claim 3, wherein the forwarding database updating engine is configured to:
  use the first maximum rate when the fill level of the forwarding table is below a first threshold;
  use the second maximum rate when the fill level of the forwarding table is above the first threshold and below a second threshold; and
  use a third maximum rate when the fill level of the forwarding table is above the second threshold, wherein the third maximum rate is lower than the second maximum rate.

5. The network device of claim 4, wherein:
the forwarding database updating engine is configured to use a maximum rate of zero when the fill level is above the second threshold so that the sending of new network addresses by the forwarding database updating engine to the CPU is suspended.

6. The network device of claim 1, wherein:
the forwarding table comprises a content addressable memory (CAM) that is configured to store network address information; and
the fill level monitor is configured to determine the fill level of the forwarding table based on a fill level of the CAM.

7. The network device of claim 6, wherein:
the forwarding table further comprises a random access memory (RAM) separate from the CAM, the RAM being configured to store forwarding information corresponding to network address information stored in the CAM; and
the fill level monitor is configured to determine the fill level of the forwarding table further based on a fill level of the RAM.

8. The network device of claim 1, wherein:
the forwarding database updating engine is configured to, in response to identifying a new network address of a packet that is not in the forwarding table, determine whether an entry in the forwarding table can be reserved for the new network address; and
the fill level monitor is configured to:
  monitor a rate at which the forwarding table update engine determines that entries in the forwarding table cannot be reserved, and
  determine the fill level of the forwarding table using at least the rate at which the forwarding table update engine determines that entries in the forwarding table cannot be reserved.

9. The network device of claim 1, wherein:
the forwarding database updating engine comprises a cache for storing information corresponding to messages previously sent to CPU by the packet processor, the messages indicating network addresses that are to be added to the forwarding table; and
the forwarding database updating engine is further configured to:
  compare information corresponding to a new message that is to be sent to CPU with information in the cache corresponding to messages previously sent to CPU, and
  when the information corresponding to the new message that is to be sent to CPU matches information in the cache, discard the new message without sending the new message to the CPU.

10. The network device of claim 9, wherein the forwarding database updating engine is further configured to, when the information corresponding to the new message that is to be sent to CPU does not match any information in the cache:
  send the new message to the CPU; and
  store the information corresponding to the new message in the cache.

11. A method for populating a forwarding table of a network device, the method comprising:
  repeatedly determining, at a packet processor, a fill level of a forwarding table that is populated with associations between network addresses and network interfaces of, or coupled to, the network device;
  adjusting, by the packet processor and based on the fill level of the forwarding table, a maximum rate according to which the packet processor is permitted to send messages to a central processing unit (CPU) coupled to the packet processor, the messages indicating network addresses that are to be stored in the forwarding table by the CPU;
  receiving, at the packet processor of the network device, packets via network links coupled to the network device;
  identifying, at the packet processor, new network addresses of the packets that are not in the forwarding table; and
  sending, by the packet processor, messages to the CPU at a rate that does not exceed the maximum rate, the messages indicating the new network addresses are to be added to the forwarding table, the CPU being configured to selectively add the new network addresses to the forwarding table.

12. The method for populating the forwarding table of claim 11, wherein adjusting the maximum rate according to which the packet processor sends messages to the CPU based on the fill level of the forwarding table comprises:

reducing the maximum rate as the fill level of the forwarding table increases.

13. The method for populating the forwarding table of claim 12, wherein reducing the maximum rate level as the fill level increases comprises:
using a first maximum rate when the fill level is below a threshold; and
using a second maximum rate when the fill level is above the threshold, wherein the second maximum rate is lower than the first maximum rate.

14. The method for populating the forwarding table of claim 13, wherein reducing the maximum rate level as the fill level increases comprises:
using the first maximum rate when the fill level is below a first threshold;
using the second maximum rate when the fill level is above the first threshold and below a second threshold; and
using a third maximum rate when the fill level is above the second threshold, wherein the third maximum rate is lower than the second maximum rate.

15. The method for populating the forwarding table of claim 14, wherein using the third maximum rate when the fill level is above the second threshold comprises:
using a maximum rate of zero so that the sending of new network addresses by the packet processor to the CPU is suspended when the fill level is above the second threshold.

16. The method for populating the forwarding table of claim 11, wherein:
the forwarding table comprises a content addressable memory (CAM) that is configured to store network address information; and
repeatedly determining the fill level of the forwarding table comprises repeatedly determining the fill level of the forwarding table based on a fill level of the CAM.

17. The method for populating the forwarding table of claim 16, wherein:
the forwarding table further comprises a random access memory (RAM) separate from the CAM, the RAM being configured to store forwarding information corresponding to network address information stored in the CAM; and
repeatedly determining the fill level of the forwarding table comprises repeatedly determining the fill level of the forwarding table further based on a fill level of the RAM.

18. The method for populating the forwarding table of claim 11, further comprising:
in response to identifying a new network address of a packet that is not in the forwarding table, determining, at the packet processor, whether an entry in the forwarding table can be reserved for the new network address; and
monitoring, at the packet processor, a rate at which the packet processor determines that entries in the forwarding table cannot be reserved;
wherein repeatedly determining the fill level of the forwarding table comprises repeatedly determining the fill level of the forwarding table using at least the rate at which the packet processor determines that entries in the forwarding table cannot be reserved.

19. The method for populating the forwarding table of claim 11, further comprising:
comparing, at the packet processor, information corresponding to a new message that is to be sent to CPU with information in a cache corresponding to messages previously sent to CPU, the messages indicating network addresses that are to be added to the forwarding table; and
when the packet processor determines that information corresponding to the new message that is to be sent to CPU matches information in the cache, discarding, by the packet processor, the new message without sending the new message to the CPU.

20. The method for populating the forwarding table of claim 19, wherein, when the packet processor determines that the information corresponding to the new message that is to be sent to CPU does not match any information in the cache:
sending, by the packet processor, the new message to the CPU; and
storing the information corresponding to the new message in the cache.

* * * * *